(12) United States Patent
Xu et al.

(10) Patent No.: US 11,656,763 B2
(45) Date of Patent: May 23, 2023

(54) FILE MANAGEMENT METHOD, DISTRIBUTED STORAGE SYSTEM, AND MANAGEMENT NODE

(71) Applicant: Huawei Technologies Co., Ltd., Shenzhen (CN)

(72) Inventors: Jun Xu, Nanjing (CN); Junfeng Zhao, Shenzhen (CN); Yuangang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 17/306,494

(22) Filed: May 3, 2021

(65) Prior Publication Data

US 2021/0255775 A1    Aug. 19, 2021

Related U.S. Application Data

(63) Continuation of application No. 16/178,220, filed on Nov. 1, 2018, now Pat. No. 11,029,848, which is a
(Continued)

(51) Int. Cl.
*G06F 3/06*    (2006.01)
*G06F 16/13*    (2019.01)

(52) U.S. Cl.
CPC .......... *G06F 3/0607* (2013.01); *G06F 3/067* (2013.01); *G06F 3/0631* (2013.01);
(Continued)

(58) Field of Classification Search
CPC .... G06F 3/0607; G06F 3/0631; G06F 3/0643; G06F 3/0652; G06F 3/067; G06F 16/13
See application file for complete search history.

(56) References Cited

U.S. PATENT DOCUMENTS 5,430,850 A * 7/1995 Papadopoulos ....... G06F 9/3009
719/314
5,822,785 A   10/1998 Ikeda et al.
(Continued)

FOREIGN PATENT DOCUMENTS

CN    1149736 A    5/1997
CN    1410905 A    4/2003
(Continued)

OTHER PUBLICATIONS

Meng Xiao-xuan et al.,"Network Storage Systan Using Out-of-band Virtualization Approach," vol. 30, No. 11, total 5 pages, Journal of Chinese Computer Systems (Nov. 2009). With English abstract.
(Continued)

*Primary Examiner* — Ryan Bertram
(74) *Attorney, Agent, or Firm* — Leydig, Voit & Mayer, Ltd.

(57) ABSTRACT

A file management method, a distributed storage system, and a management node are disclosed. In the distributed storage system, after receiving a file creation request sent by a host for requesting to create a file in a distributed storage system, a management node allocates, to the file, first virtual space from global virtual address space of the distributed storage system, where local virtual address space of each storage node in the distributed storage system is corresponding to a part of the global virtual address space. Then, the management node records metadata of the file, where the metadata of the file includes information about the first virtual space, and the information about the first virtual space is used to point to local virtual address space of a storage node that is used to store the file. Further, the management node sends, the information about the first virtual space to the host.

18 Claims, 7 Drawing Sheets

Related U.S. Application Data continuation of application No. 15/428,527, filed on Feb. 9, 2017, now Pat. No. 10,152,233, which is a continuation of application No. PCT/CN2014/084196, filed on Aug. 12, 2014.

(52) U.S. Cl.
CPC .......... *G06F 3/0643* (2013.01); *G06F 3/0652* (2013.01); *G06F 16/13* (2019.01)

(56) References Cited

U.S. PATENT DOCUMENTS

| | | | | |
|---|---|---|---|---|
| 5,848,254 | A * | 12/1998 | Hagersten | G06F 9/383 712/E9.047 |
| 5,896,501 | A * | 4/1999 | Ikeda | G06F 12/0692 709/215 |
| 6,101,590 | A * | 8/2000 | Hansen | G06F 12/1045 711/E12.013 |
| 6,205,528 | B1 | 3/2001 | Kingsbury et al. | |
| 6,240,501 | B1 * | 5/2001 | Hagersten | G06F 12/1018 711/170 |
| 6,948,044 | B1 * | 9/2005 | Chandrasekaran | H04L 67/1097 709/224 |
| 7,334,108 | B1 | 2/2008 | Case et al. | |
| 7,877,540 | B2 | 1/2011 | Sinclair | |
| 2002/0013889 | A1 * | 1/2002 | Schuster | G06F 12/145 711/E12.066 |
| 2003/0163649 | A1 * | 8/2003 | Kapur | G06F 12/0862 711/146 |
| 2004/0019686 | A1 | 1/2004 | Toyoda et al. | |
| 2004/0044872 | A1 * | 3/2004 | Scott | G06F 12/0284 711/E12.066 |
| 2004/0073742 | A1 * | 4/2004 | Arimilli | G06F 12/0292 711/202 |
| 2004/0117549 | A1 | 6/2004 | Nakamura | |
| 2004/0117587 | A1 | 6/2004 | Arimilli et al. | |
| 2005/0005074 | A1 * | 1/2005 | Landin | G06F 12/1072 711/E12.027 |
| 2005/0015378 | A1 | 1/2005 | Gammel et al. | |
| 2005/0044340 | A1 * | 2/2005 | Sheets | G06F 12/1036 711/148 |
| 2005/0235005 | A1 | 10/2005 | Aono | |
| 2008/0104375 | A1 | 5/2008 | Hansen et al. | |
| 2008/0313192 | A1 | 12/2008 | Crienen et al. | |
| 2009/0089537 | A1 * | 4/2009 | Vick | G06F 12/0284 711/E12.09 |
| 2009/0150641 | A1 | 6/2009 | Flynn et al. | |
| 2009/0198946 | A1 | 8/2009 | Ebata | |
| 2011/0082997 | A1 | 4/2011 | Yochai et al. | |
| 2011/0173396 | A1 | 7/2011 | Sugumar et al. | |
| 2012/0311237 | A1 | 12/2012 | Park | |
| 2012/0317379 | A1 | 12/2012 | Ali et al. | |
| 2016/0267155 | A1 | 9/2016 | Liu et al. | |
| 2020/0159669 | A1 * | 5/2020 | Duncan | G06F 12/1027 |
| 2021/0089220 | A1 * | 3/2021 | Gkoulalas-Divanis | G06F 21/6245 |

FOREIGN PATENT DOCUMENTS

| | | |
|---|---|---|
| CN | 1261884 C | 6/2006 |
| CN | 101187930 A | 5/2008 |
| CN | 101398768 A | 4/2009 |
| CN | 101477495 A | 7/2009 |
| CN | 101477496 A | 7/2009 |
| CN | 102255962 A | 11/2011 |
| CN | 103049334 A | 4/2013 |
| CN | 103414761 A | 11/2013 |
| CN | 103608783 A | 2/2014 |
| CN | 103617175 A | 3/2014 |
| CN | 103797770 A | 5/2014 |
| JP | H02141863 A | 5/1990 |
| JP | 2000267979 A | 9/2000 |
| JP | 2004013276 A | 1/2004 |
| JP | 2005309648 A | 11/2005 |
| RU | 2411685 C2 | 2/2011 |

OTHER PUBLICATIONS

U.S. Appl. No. 16/178,220, filed Nov. 1, 2018.
U.S. Appl. No. 15/428,527, filed Feb. 9, 2017.

* cited by examiner

FILE MANAGEMENT METHOD, DISTRIBUTED STORAGE SYSTEM, AND MANAGEMENT NODE

CROSS-REFERENCE TO RELATED APPLICATIONS

This application is a continuation of U.S. patent application Ser. No. 16/178,220, filed on Nov. 1, 2018, which is a continuation of U.S. patent application Ser. No. 15/428,527, filed on Feb. 9, 2017, now U.S. Pat. No. 10,152,233. The U.S. patent application Ser. No. 15/428,527 is a continuation of International Application No. PCT/CN2014/084196, filed on Aug. 12, 2014. All of the aforementioned patent applications are hereby incorporated by reference in their entireties.

TECHNICAL FIELD

The present disclosure relates to the field of storage technologies, and specifically, to a file management method, a distributed storage system, and a management node.

BACKGROUND

A next-generation nonvolatile memory may include a nonvolatile memory that has a capability of being addressed and accessed by byte, such as a phase change memory (PCM), a resistive random access memory (ReRAM), or a magnetoresistive random access memory (MRAM). The next-generation nonvolatile memory can provide an interface similar to that of a dynamic random access memory (DRAM). In a practical application, the next-generation nonvolatile memory may be managed in a page management manner similar to that of the DRAM. Currently, a storage system based on the next-generation nonvolatile memory is a research focus in the industry.

Generally, a conventional storage system, a distributed file system, or the like records a location of file data in a storage medium using metadata, to manage the file data. The metadata uses a global contents-based namespace, and generally uses a data structure such as a B-tree. For a data block of a file, the data block of the file is traced in a manner of recording a storage node on which the data block is located or even recording a location on a storage node. This manner is applicable to a block device-based scenario in which a conventional hard disk drive (HDD), solid state drive (SSD), or the like is used. After a storage system uses a new nonvolatile memory (NVM), although an original method can be applied to the new NVM, because the metadata occupies relatively large storage space, and information such as a storage location corresponding to each data block of the file needs to be recorded in the metadata, management burden is relatively heavy, efficiency of accessing the storage node by a host by obtaining the metadata is also low, and consequently, file management efficiency is relatively low.

SUMMARY

Embodiments of the present disclosure provide a file management method, a distributed storage system, and a management node, and can improve file management efficiency.

According to a first aspect, a file management method is provided, where the method is applied to a distributed storage system, the distributed storage system includes a management node and multiple storage nodes, and the method includes:

receiving, by the management node, a file creation request sent by a host to create a file in the distributed storage system;

allocating, by the management node to the file, first virtual space from global virtual address space of the distributed storage system according to the file creation request, where local virtual address space of each storage node in the distributed storage system corresponds to a part of the global virtual address space;

recording, by the management node, metadata of the file including information about the first virtual space allocated to the file, the information about the first virtual space points to first local virtual address space of a first storage node that stores the file; and sending, by the management node, a file creation success response to the host carrying the information about the first virtual space.

With reference to the first aspect, in a first possible implementation manner, an address bit quantity of the global virtual address space is greater than an address bit quantity of local virtual address space of a storage node in the distributed storage system.

With reference to the first aspect or the first possible implementation manner of the first aspect, in a second possible implementation manner, the address bit quantity 2N of the global virtual address space is twice the address bit quantity N of the local virtual address space of the storage node in the distributed storage system, where the N most significant bits of an address of the global virtual address space are used to point to the storage node and the N least significant bits of the address of the global virtual address space are used to point to the local virtual address space of the storage node, and N is the address bit quantity of the local virtual address space of the storage node.

With reference to the first aspect, or the first or the second possible implementation manner of the first aspect, in a third possible implementation manner, the information about the first virtual space includes a file start address and a file size of the file in the global virtual address space.

With reference to any one of the first aspect, or the first to the third possible implementation manners of the first aspect, in a fourth possible implementation manner, the global virtual address space includes multiple areas, and different areas in the multiple areas have different space allocation granularities; and the allocating includes:

allocating, by the management node to the file, the first virtual space from a first area in the global virtual address space of the distributed storage system according to the file creation request and a space allocation granularity of the first area, where the space allocation granularity of the first area i is the smallest value among that of areas that can be currently allocated.

With reference to the fourth possible implementation manner of the first aspect, in a fifth possible implementation manner, the method further includes:

receiving, by the management node, a file space expansion request sent by the host requesting to expand a space of the file;

allocating, by the management node and to the file, second virtual space from a second area in the global virtual address space according to the file space expansion request and a space allocation granularity of the second area, where the space allocation granularity of the second area is greater than the space allocation granularity of the first area;

updating, by the management node, the metadata of the file, where the updated metadata of the file includes information about the second virtual space allocated to the file, the information about the second virtual space points to second local virtual address space of a second storage node that stores the file; and sending, by the management node, a file space expansion response to the host carrying the information about the second virtual space.

With reference to any one of the first aspect, or the first to the fifth possible implementation manners of the first aspect, in a sixth possible implementation manner, the method further includes:

deleting, by the management node, the metadata of the file, and reclaiming the first virtual space allocated from the global virtual address space to the file;

determining, by the management node and according to a preset correspondence between the global virtual address space and the local virtual address space, the first storage node that stores the file; and sending, by the management node, a space reclaiming message to the first storage node stores the file, where the space reclaiming message instructs the first storage node that stores the file to reclaim the first local virtual address space and first local physical storage space corresponding to the file.

According to a second aspect, a distributed storage system is provided, including a management node and multiple storage nodes, where a local virtual address space of each of the multiple storage nodes corresponds to a part of a global virtual address space of the distributed storage system, wherein the management node is configured to: receive a file creation request sent by a host to create a file in the distributed storage system; allocate, to the file, first virtual space from the global virtual address space according to the file creation request; record metadata of the file including information about the first virtual space allocated to the file, the information about the first virtual space points to first local virtual address space of a first storage node that stores the file; and send a file creation success response to the host carrying the information about the first virtual space.

With reference to the second aspect, in a first possible implementation manner, an address bit quantity of the global virtual address space is greater than an address bit quantity of local virtual address space of a storage node in the distributed storage system.

With reference to the second aspect or the first possible implementation manner of the second aspect, in a second possible implementation manner, the address bit quantity 2N of the global virtual address space is twice the address bit quantity N of the local virtual address space of the storage node in the distributed storage system, where the N most significant bits of an address of the global virtual address space are used to point to the storage node and the N least significant bits of the address of the global virtual address space are used to point to the local virtual address space of the storage node.

With reference to the second aspect, or the first or the second possible implementation manner of the second aspect, in a third possible implementation manner, the information about the first virtual space includes a file start address and a file size of the file in the global virtual address space.

With reference to any one of the second aspect, or the first to the third possible implementation manners of the second aspect, in a fourth possible implementation manner, the global virtual address space includes multiple areas and different areas in the multiple areas have different space allocation granularities; and the management node is specifically configured to allocate, to the file, the first virtual space from a first area in the global virtual address space of the distributed storage system according to the file creation request and a space allocation granularity of the first area, where the space allocation granularity of the first area is the smallest value among that of areas that can be currently allocated.

With reference to the fourth possible implementation manner of the second aspect, in a fifth possible implementation manner, the management node is further configured to: receive a file space expansion request sent by the host requesting expand a space of the file; allocate, to the file, second virtual space from a second area in the global virtual address space according to the file space expansion request and a space allocation granularity of the second area, where the space allocation granularity of the second area is greater than the space allocation granularity of the first area; update the metadata of the file, where the updated metadata of the file includes information about the second virtual space allocated to the file, and the information about the second virtual space points to second local virtual address space of a second storage node that stores the file; and send a file space expansion response to the host carrying the information about the second virtual space.

With reference to any one of the second aspect, or the first to the fifth possible implementation manners of the second aspect, in a sixth possible implementation manner, the management node is further configured to: delete the metadata of the file and reclaim the first virtual space allocated from the global virtual address space to the file; determine, according to a preset correspondence between the global virtual address space and the local virtual address space, the first storage node that stores the file; and send a space reclaiming message to the first storage node that stores the file, where the space reclaiming message instructs the first storage node that stores the file to reclaim the first local virtual address space and first local physical storage space corresponding to the file; where the first storage node that stores the file is configured to reclaim, according to the space reclaiming message, the local virtual address space and the local physical storage space corresponding to the file.

According to a third aspect, a management node is provided, including:

a receiving unit, coupled to the communications interface and configured to receive a file creation request sent by a host to create a file in a distributed storage system;

a management unit, configured to: allocate, to the file, first virtual space from global virtual address space of the distributed storage system according to the file creation request, where local virtual address space of each storage node in the distributed storage system corresponds to a part of the global virtual address space; and record metadata of the file comprising information about the first virtual space allocated to the file, the information about the first virtual space points to first local virtual address space of a first storage node that stores the file; and a sending unit, configured to send a file creation success response to the host carrying the information about the first virtual space.

With reference to the third aspect, in a first possible implementation manner, an address bit quantity of the global virtual address space is greater than an address bit quantity of local virtual address space of a storage node in the distributed storage system.

With reference to the third aspect or the first possible implementation manner of the third aspect, in a second possible implementation manner, the address bit quantity 2N of the global virtual address space is twice the address bit quantity N of the local virtual address space of the storage node in the distributed storage system, where the N most significant bits of an address of the global virtual address space are used to point to the storage node and the N least significant bits of the address of the global virtual address space are used to point to the local virtual address space of the storage node.

With reference to the third aspect, or the first or the second possible implementation manner of the third aspect, in a third possible implementation manner, the information about the first virtual space includes a file start address and a file size of the file in the global virtual address space.

With reference to any one of the third aspect, or the first to the third possible implementation manners of the third aspect, in a fourth possible implementation manner, the global virtual address space includes multiple areas and different areas in the multiple areas have different space allocation granularities; and the management unit is specifically configured to allocate, to the file, the first virtual space from a first area in the global virtual address space of the distributed storage system according to the file creation request and a space allocation granularity of the first area, where the space allocation granularity of the first area is a smallest value among that of areas that can be currently allocated.

With reference to the fourth possible implementation manner of the third aspect, in a fifth possible implementation manner, the receiving unit is further configured to receive a file space expansion request sent by the host requesting to expand a space of the file;

the management unit is further configured to: allocate, to the file, second virtual space from a second area in the global virtual address space according to the file space expansion request and a space allocation granularity of the second area, where the space allocation granularity of the second area is greater than the space allocation granularity of the first area; and update the metadata of the file, where the updated metadata of the file includes information about the second virtual space allocated to the file; and the sending unit is further configured to send a file space expansion response to the host carrying the information about the second virtual space.

With reference to any one of the third aspect, or the first to the fifth possible implementation manners of the third aspect, in a sixth possible implementation manner, the management unit is further configured to: delete the metadata of the file, and reclaim the space allocated from the global virtual address space to the file; and determine, according to a preset correspondence between the global virtual address space and the local virtual address space, the storage node that stores the file; and the sending unit is further configured to send a space reclaiming message to the first storage node that stores the file, where the space reclaiming message instructs the first storage node that stores the file to reclaim the first local virtual address space and first local physical storage space corresponding to the file.

According to a fourth aspect, an embodiment of the present disclosure provides a computer program product, where the computer program product includes a computer readable storage medium that stores program code, and an instruction included in the program code is used to execute the method described in the foregoing first aspect.

Based on the foregoing technical solutions, according to the file management method, the distributed storage system, and the management node in the embodiments of the present disclosure, space is allocated to a file from global virtual address space of a distributed storage system, and the file may be managed based on the allocated global virtual address space, without a need to process complex storage location information of a data block of the file, so that file management efficiency can be improved.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure.

It should be understood that technical solutions of the embodiments of the present disclosure may be applied to various storage systems, and particularly, to a distributed storage system that is based on a nonvolatile memory.

It should also be understood that, in the embodiments of the present disclosure, a term "virtual address space" may also be expressed as "virtual space", that is, the "virtual address space" and the "virtual space" are referred to each other.

Figure 1:
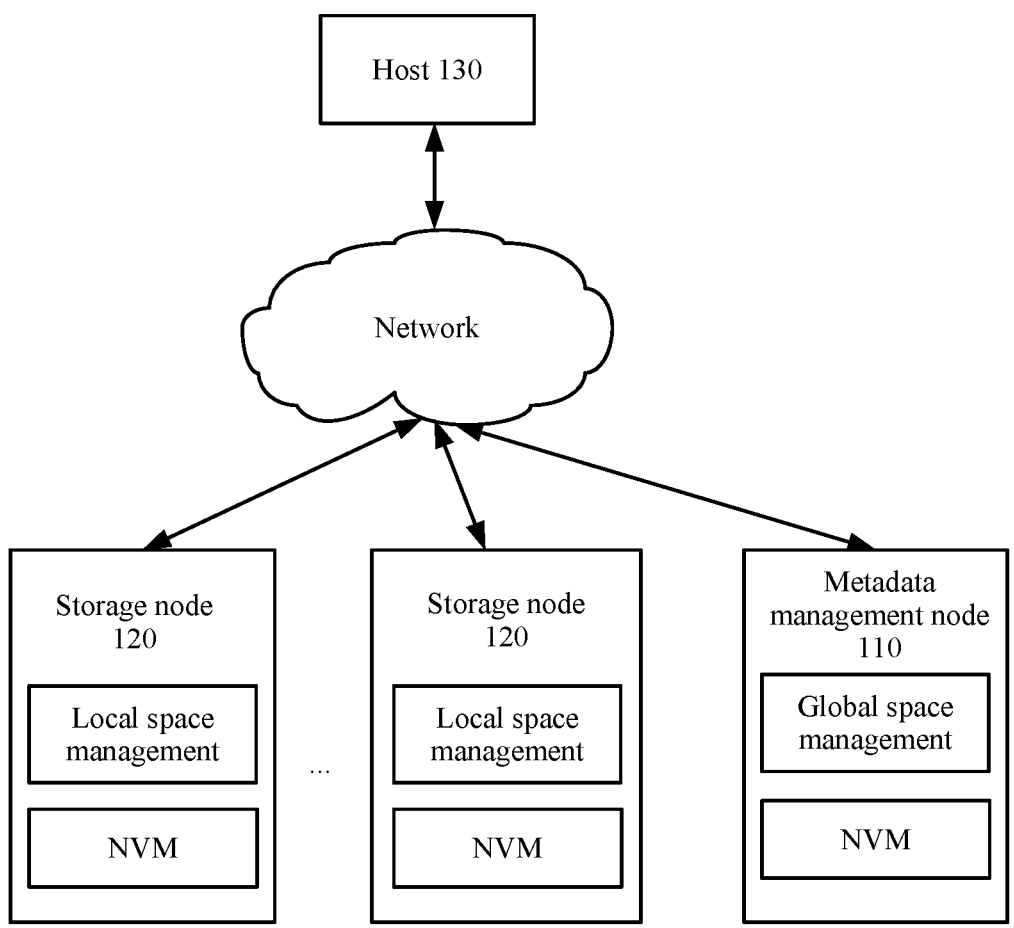
FIG. 1 is a schematic diagram of an application scenario according to an embodiment of the present disclosure.

FIG. 1 is a schematic diagram of an application scenario according to an embodiment of the present disclosure. In FIG. 1, a host 130, a storage node 120, and a metadata management node 110 are interconnected using a network. The storage node 120 and the metadata management node 110 constitute a distributed storage system.

The host 130 can access a file in the distributed storage system. The host 130 may be a computer, or may be other user equipment, and the host 130 may communicate with the distributed storage system using the network. The host 130 may include any computation device known in the prior art, such as a server or a desktop computer. An operating system and another application program are installed in the host 130. There may be multiple hosts 130.

The storage node 120 is used to store file data. The storage node 120 may include at least one memory. For example, the memory may include a new nonvolatile memory NVM that has a capability of being addressed and accessed by byte, such as a phase change memory (PCM), a resistive random access memory (ReRAM), or a magnetoresistive random access memory (MRAM); or may include another memory. FIG. 1 uses only the NVM as an example in which the storage node 120 manages physical storage space that includes the NVM and the like on the storage node 120.

The metadata management node 110 is responsible for global virtual address space management, and provides a function such as file metadata querying.

The metadata management node 110 and the storage node 120 may be combined together, that is, one node may have functions of both a metadata management node and a storage node.

In the embodiments of the present disclosure, a management node may be a metadata management node (such as the metadata management node 110 in FIG. 1), or may be a node that has functions of both a metadata management node and a storage node. For ease of description, the following uses the management node as an example for description.

Figure 2:
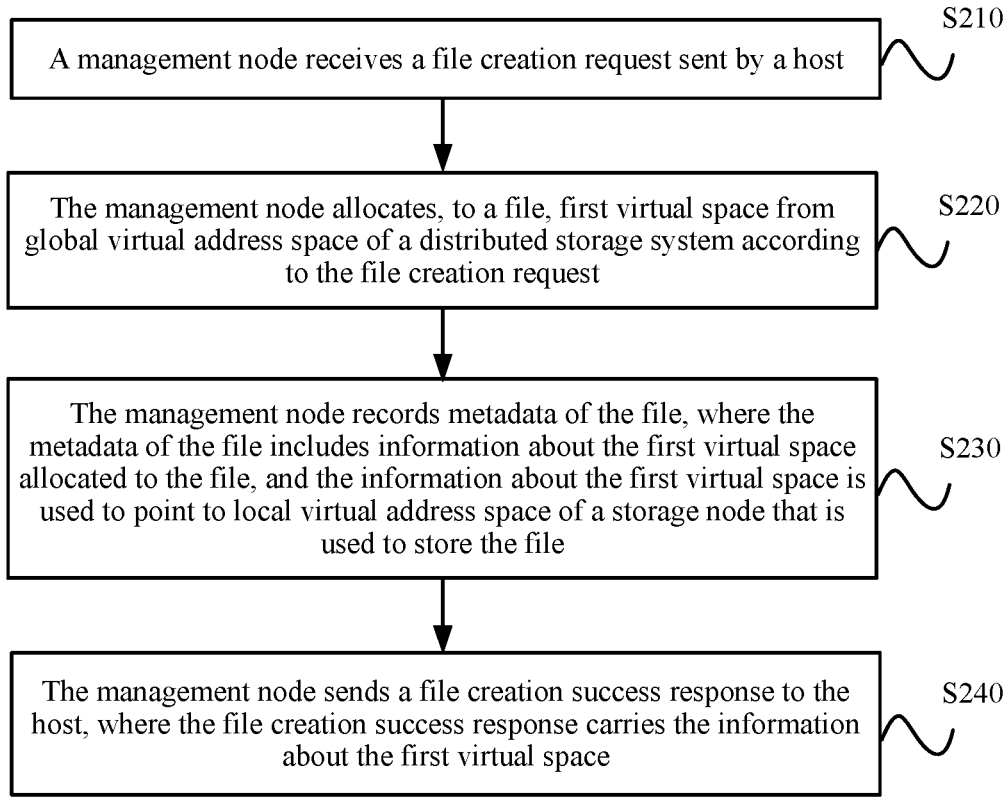
FIG. 2 is a schematic flowchart of a file management method according to an embodiment of the present disclosure.

FIG. 2 shows a schematic flowchart of a file management method 200 according to an embodiment of the present disclosure. The method 200 is applied to a distributed storage system, and the distributed storage system includes a management node and multiple storage nodes. The method 200 is executed by the management node.

S210. The management node receives a file creation request sent by a host, where the file creation request is used to request to create a file in the distributed storage system.

S220. The management node allocates, to the file, first virtual space from global virtual address space of the distributed storage system according to the file creation request, where in this embodiment of the present disclosure, local virtual address space of each storage node in the distributed storage system is corresponding to a part of the global virtual address space.

In this embodiment of the present disclosure, a file in the distributed storage system is managed based on the global virtual address space. The global virtual address space is virtual space of the distributed storage system. The local virtual address space of each storage node in the distributed storage system is corresponding to a part of the global virtual address space.

An address bit quantity of the local virtual address space is a bit quantity of an operating system (OS). For example, for a 64-bit OS, the address bit quantity of the local virtual address space is 64 bits, and a size of the local virtual address space is $2^{64}$ bytes ($\hat{\ }$ represents the power). An address bit quantity of the global virtual address space may be 128 bits, and a size of the global virtual address space is $2^{128}$ bytes. In this case, the local virtual address space of each storage node may be corresponding to a part of the global virtual address space.

In a case, a correspondence (which may also be referred to as a mapping relationship) between the global virtual address space and the local virtual address space may be established in advance. For example, the correspondence between the global virtual address space and the local virtual address space is configured in advance on the management node. After the management node allocates the space to the file, the allocated global virtual address space may be corresponding to the local virtual address space of a storage node according to the correspondence established in advance. In another case, a correspondence (which may also be referred to as a mapping relationship) between the global virtual address space and the local virtual address space may be established when the space is being allocated to the file. For example, when allocating the space to the file, the management node may establish the correspondence between the allocated global virtual address space and the local virtual address space, and save the correspondence between the allocated global virtual address space and the local virtual address space. The allocated global virtual address space may be corresponding to the local virtual address space of the storage node according to the correspondence. In this embodiment of the present disclosure, how to establish the correspondence between the global virtual address space and the local virtual address space is not limited.

When receiving the file creation request sent by the host, the management node allocates, to the file, a continuous segment of space (represented as the first virtual space) from the global virtual address space of the distributed storage system. Based on the correspondence between the global virtual address space and the local virtual address space, the first virtual space may be mapped to the local virtual address space of the storage node.

S230. The management node records metadata of the file, where the metadata of the file includes information about the first virtual space allocated to the file, and the information about the first virtual space is used to point to local virtual address space of a storage node that is used to store the file.

After allocating, to the file, the first virtual space from the global virtual address space, the management node records the metadata of the file, where the metadata of the file includes the information about the first virtual space allocated to the file.

Optionally, the information about the first virtual space may include a start address and a size, of the file, in the global virtual address space. The information about the first virtual space is used to point to the local virtual address space of the storage node that is used to store the file. That is, based on the correspondence between the global virtual address space and the local virtual address space, the first virtual space allocated to the file is mapped to the local virtual address space of the storage node that is used to store the file, and is further mapped to local physical storage space using the local virtual address space.

S240. The management node sends a file creation success response to the host, where the file creation success response carries the information about the first virtual space.

The file creation success response sent by the management node to the host carries the information about the first virtual space. In this case, the host may access the file according to the information about the first virtual space. For example, the host changes a request for accessing the file to a request for accessing the global virtual address space, and accesses the first virtual space, thereby achieving a purpose of accessing the file. In addition, the management node may manage the metadata of the file and the file based on the global virtual address space, without a need to process complex storage location information of a data block of the file, so that file management efficiency can be improved.

Therefore, according to the file management method in this embodiment of the present disclosure, space is allocated to a file from global virtual address space of a distributed storage system, and the file may be managed based on the allocated global virtual address space, without a need to process complex storage location information of a data block of the file, so that file management efficiency can be improved.

In this embodiment of the present disclosure, optionally, the local virtual address space of the storage node may be a segment of unused space in virtual address space of the OS. For example, a size of virtual address space of the 64-bit OS is 2 raised to the power of 64. The virtual address space of the 64-bit OS includes reserved virtual address space in addition to user mode process virtual address space and kernel virtual address space. The local virtual address space may be the reserved virtual address space of the OS. Alternatively, the virtual address space of the operating system may be re-divided according to a need, and a segment of virtual address space is obtained by means of division and used as the local virtual address space for data storage by the storage node.

In this embodiment of the present disclosure, the global virtual address space is used to manage together all files in the distributed storage system. The global virtual address space is not less than local virtual address space of all storage nodes in the distributed storage system.

In an embodiment of the present disclosure, optionally, an address bit quantity of the global virtual address space is greater than the address bit quantity of the local virtual address space of the storage node in the distributed storage system. When the address bit quantity of the local virtual address space is the bit quantity of the OS, the address bit quantity of the global virtual address space is greater than the bit quantity of the OS. In this case, some address bits of the global virtual address space may be used to point to the storage node, and the other address bits may be used to point to the local virtual address space of the storage node. Specifically, if the address bit quantity of the global virtual address space is M, and the address bit quantity of the local virtual address space of the storage node is N, M−N most significant bits of an address of the global virtual address space may be used to point to the storage node. For example, the M−N most significant bits may be corresponding to an identifier and/or routing information of the storage node. N least significant bits of the address of the global virtual address space are used to point to the local virtual address space of the storage node. For example, the N least significant bits may be corresponding to an address of the local virtual address space of the storage node.

In an embodiment of the present disclosure, optionally, the address bit quantity of the global virtual address space is twice the address bit quantity of the local virtual address space of the storage node in the distributed storage system. That is, if the address bit quantity of the local virtual address space of the storage node is N, the address bit quantity of the global virtual address space may be 2N. For example, when the address of the local virtual address space of the storage node has 64 bits, and the address of the global virtual address space has 128 bits; in this case, a size of the local virtual address space of the storage node is 2^64 bytes, and a size of the global virtual address space is 2^128 bytes.

Optionally, N most significant bits of the address of the global virtual address space are used to point to the storage node, and the N least significant bits of the address of the global virtual address space are used to point to the local virtual address space of the storage node. Specifically, the N least significant bits of the address of the global virtual address space are corresponding to the address of the local virtual address space of the storage node and the N most significant bits of the address of the global virtual address space are corresponding to the identifier and/or the routing information of the storage node. For example, when the address of the local virtual address space of the storage node has 64 bits, and the address of the global virtual address space has 128 bits, 64 least significant bits of the address of the global virtual address space are corresponding to the address of the local virtual address space of the storage node, and 64 most significant bits of the address of the global virtual address space are corresponding to the identifier and/or the routing information of the storage node.

It should be understood that the correspondence between the global virtual address space and the local virtual address space may be another correspondence. For example, multiple storage nodes form one group, the N most significant bits of the address of the global virtual address space are corresponding to a group number, and the N least significant bits are corresponding to a location in the group. When space is being allocated to the file, the group number is determined first, and then a continuous virtual address space segment of a storage node in the group is determined, so that virtual pages of the file are distributed in strips in the group. For example, if eight nodes form one group, the first page of the file is stored on the first node in the group, the eighth page falls on the eighth node, the ninth page falls on the first node, the sixteenth page falls on the eighth node, and so on.

Figure 3:
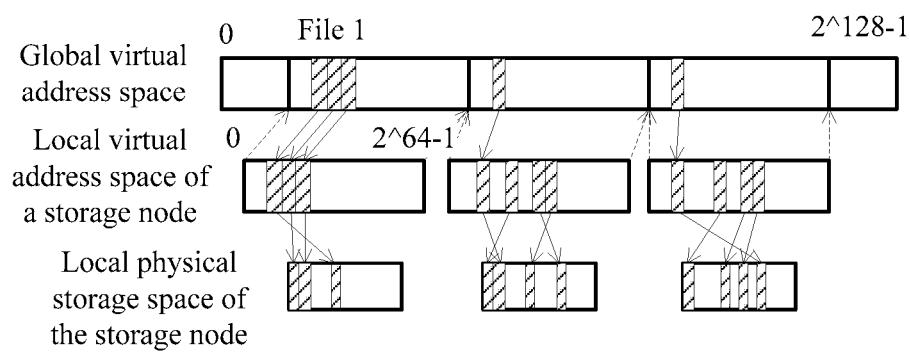
FIG. 3 is a schematic diagram of an example of global virtual address space according to an embodiment of the present disclosure.

FIG. 3 is a schematic diagram of an example of global virtual address space. As shown in FIG. 3, local virtual address space of a storage node may be mapped to local physical storage space of the storage node. In an embodiment shown in FIG. 3, an address of the local virtual address space of the storage node has 64 bits, and a size of the local virtual address space of the storage node is 2^64 bytes. An address of the global virtual address space has 128 bits, and a size of the global virtual address space is 2^128 bytes. The local virtual address space of the storage node may be corresponding to a part of the global virtual address space. That is, the global virtual address space may be mapped to local virtual address space of each storage node.

In this embodiment of the present disclosure, a file in a distributed storage system may be managed in the foregoing global virtual address space whose size is 2^128 bytes. Each file occupies a continuous segment of the global virtual address space. The global virtual address space segment allocated to the file is mapped to the local virtual address space of each storage node, and is mapped to local physical storage space of the storage node using the local virtual address space. For example, a continuous segment of space is allocated from the global virtual address space to a file 1, where the continuous segment of space allocated to the file 1 is corresponding to a segment of local virtual address space of a first storage node, and is mapped to local physical storage space of the first storage node.

Figure 4:
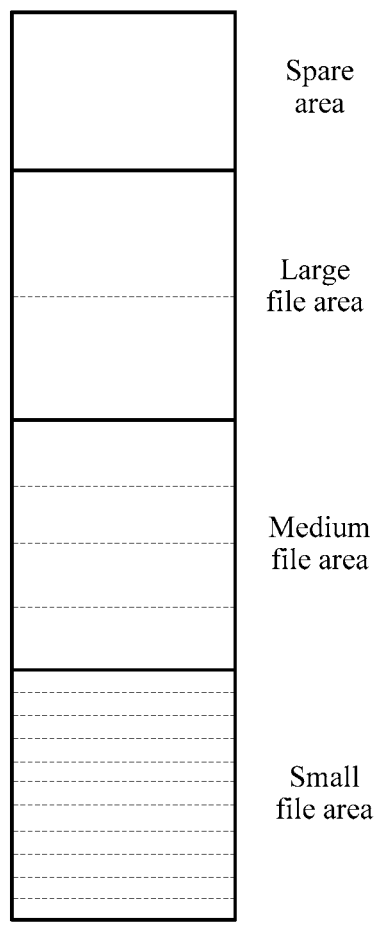
FIG. 4 is a schematic diagram of an area in global virtual address space according to an embodiment of the present disclosure.

In an embodiment of the present disclosure, optionally, the global virtual address space includes multiple areas, and different areas in the multiple areas have different space allocation granularities. Specifically, the global virtual address space may be divided into multiple areas that have different space allocation granularities. For example, as shown in FIG. 4, the global virtual address space is divided into a large file area, a medium file area, a small file area, and a spare area. A space allocation granularity of the small file area is the smallest, a space allocation granularity of the medium file area is the second smallest, and a space allocation granularity of the large file area is the largest. For example, the space allocation granularity of the small file area may be 1 MB, and if space is allocated from the small file area to a file, 1-MB space is allocated to the file. The space allocation granularity of the medium file area may be 100 MB, and if space is allocated from the medium file area to a file, 100-MB space may be allocated to the file. The space allocation granularity of the large file area may be 1 GB, and if space is allocated from the large file area to a file, 1-GB space is allocated to the file. During creation of a file, first, space may be allocated from the small file area to the file according to the space allocation granularity of the small file area. Then, when a size of the file exceeds the previously allocated space, space is reallocated, to the file according to the space allocation granularity of the file area, from the file area that is one level higher than the small file area.

Figure 5:
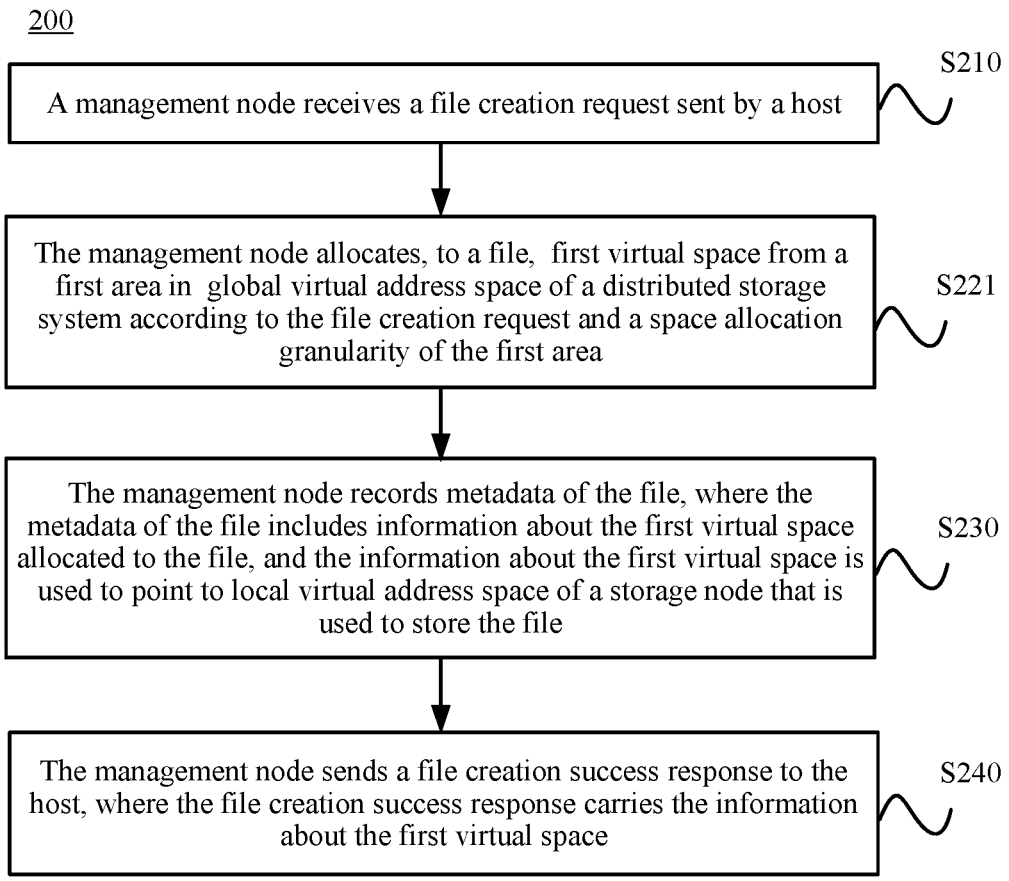
FIG. 5 is a schematic flowchart of a file management method according to another embodiment of the present disclosure.

Optionally, as shown in FIG. 5, in an embodiment of the present disclosure, S220 of the method 200 may be specifically as follows:

S221. The management node allocates, to the file, the first virtual space from a first area in the global virtual address space of the distributed storage system according to the file creation request and a space allocation granularity of the first area.

The first area is an area whose space allocation granularity is the smallest in areas that can be currently allocated. For example, the first area may be the small file area in FIG. 4. During creation of the file, first, space is allocated from the small file area to the file according to the space allocation granularity of the small file area.

S210, S230, and S240 in FIG. 5 are the same as those in FIG. 2, and details are not repeatedly described herein.

Figure 6:
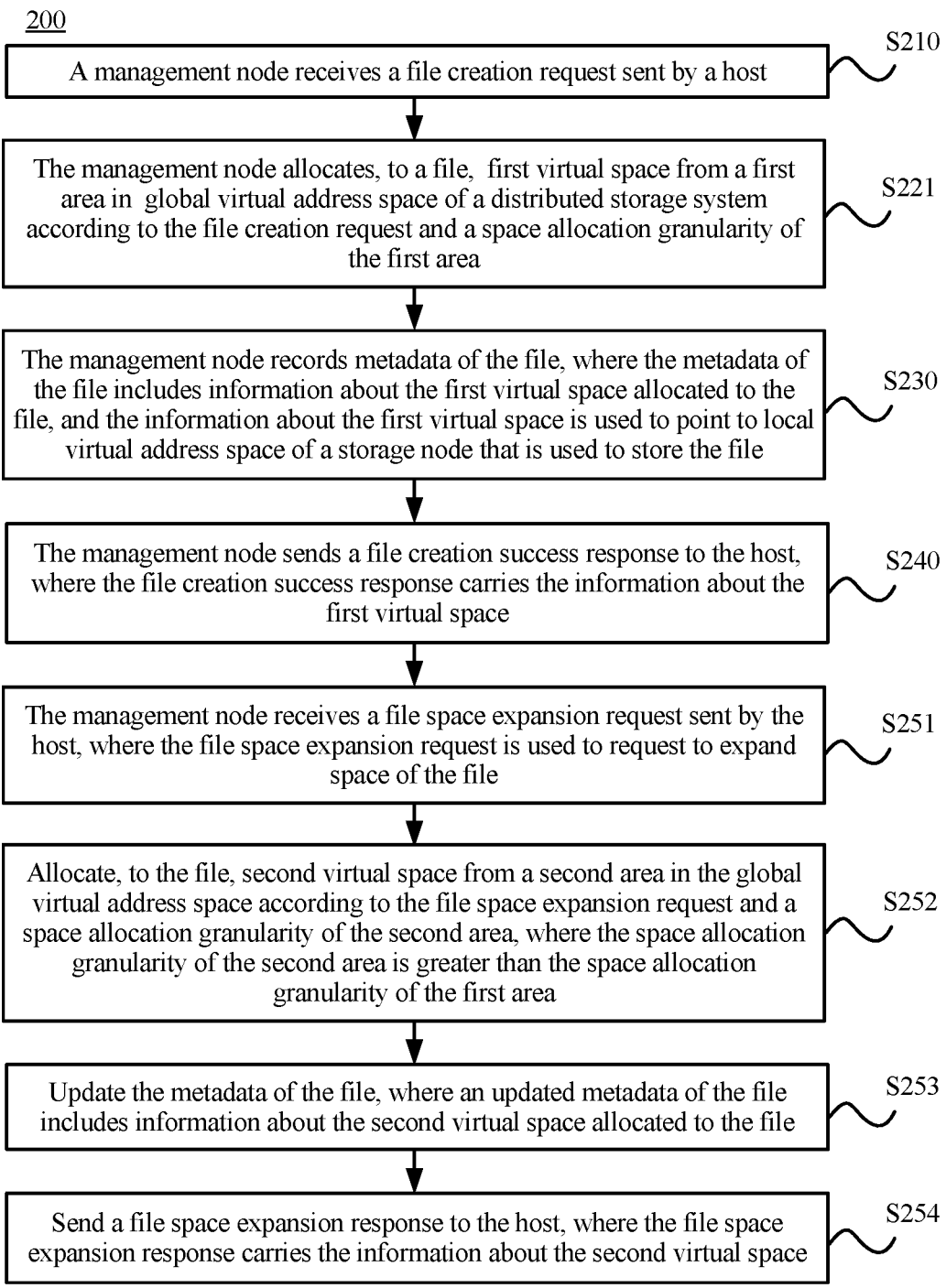
FIG. 6 is a schematic flowchart of a file management method according to still another embodiment of the present disclosure.

Optionally, as shown in FIG. 6, in an embodiment of the present disclosure, the method 200 may further include the following steps:

S251. The management node receives a file space expansion request sent by the host, where the file space expansion request is used to request to expand space of the file.

S252. Allocate, to the file, second virtual space from a second area in the global virtual address space according to the file space expansion request and a space allocation granularity of the second area, where the space allocation granularity of the second area is greater than the space allocation granularity of the first area.

S253. Update the metadata of the file, where an updated metadata of the file includes information about the second virtual space allocated to the file.

S254. Send a file space expansion response to the host, where the file space expansion response carries the information about the second virtual space.

Specifically, when the space of the file needs to be expanded, the host sends the file space expansion request to the management node. The management node allocates, to the file, space (represented as the second virtual space) from the second area in the global virtual address space according to the file space expansion request and the space allocation granularity of the second area. The space allocation granularity of the second area is greater than the space allocation granularity of the first area. Specifically, the second area may be an area whose space allocation granularity is the smallest in areas whose space allocation granularities are greater than that of the first area and that are in the areas that can be currently allocated. For example, when the first area is the small file area in FIG. 4, the second area may be the medium file area in FIG. 4; when the first area is the medium file area in FIG. 4, the second area may be the large file area in FIG. 4. After reallocating the space to the file, the management node updates the metadata of the file, that is, updates the metadata of the file to the information about the second virtual space allocated to the file; reclaims the space, that is, the first virtual space, that is allocated from the first area to the file; and then sends the file space expansion response to the host, where the file space expansion response carries the information about the second virtual space.

Figure 7:
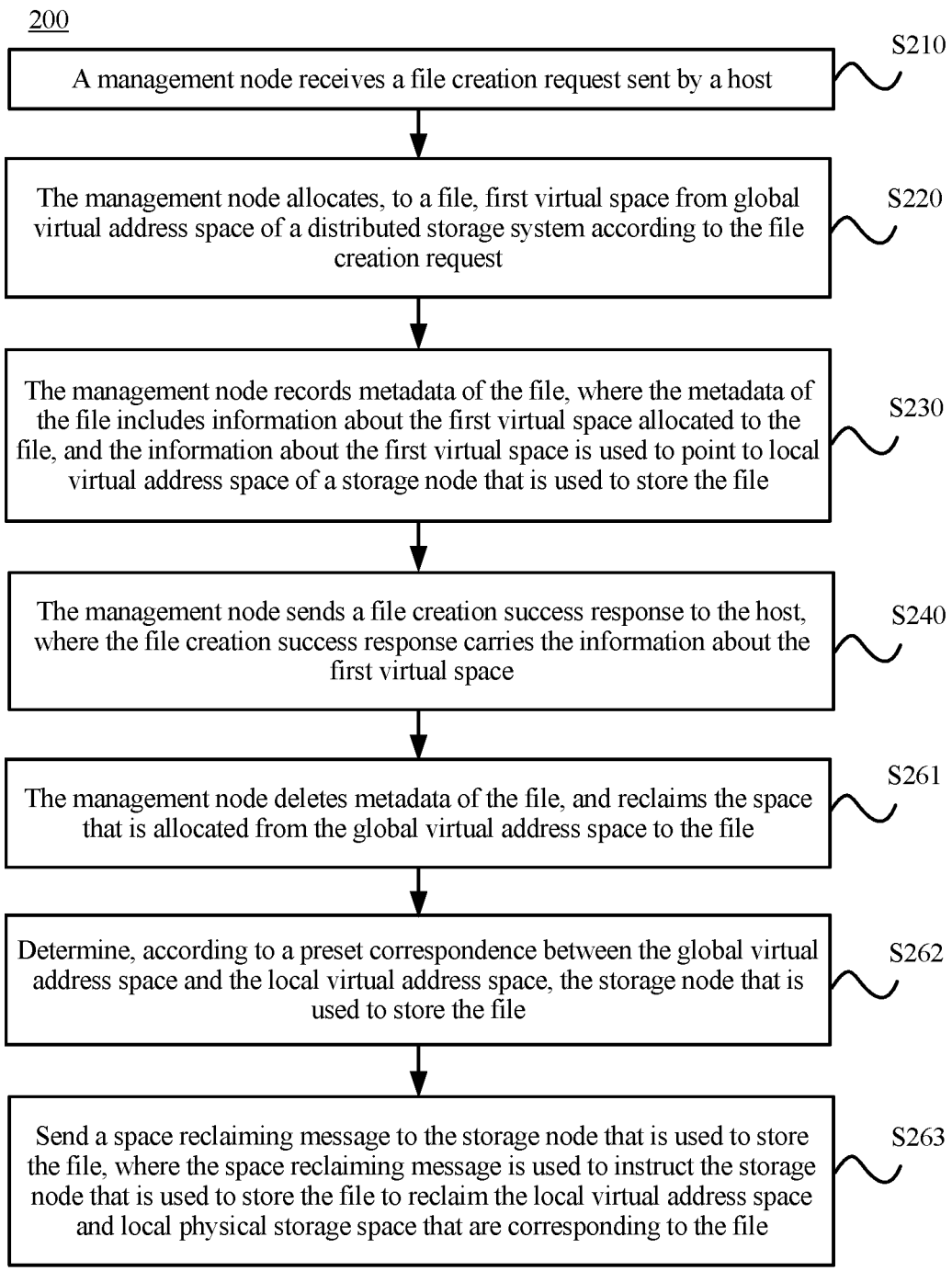
FIG. 7 is a schematic flowchart of a file management method according to yet another embodiment of the present disclosure.

Optionally, as shown in FIG. 7, in an embodiment of the present disclosure, the method 200 may further include the following steps:

S261. The management node deletes the metadata of the file, and reclaims the space that is allocated from the global virtual address space to the file.

S262. Determine, according to a preset correspondence between the global virtual address space and the local virtual address space, the storage node that is used to store the file.

S263. Send a space reclaiming message to the storage node that is used to store the file, where the space reclaiming message is used to instruct the storage node that is used to store the file to reclaim the local virtual address space and local physical storage space that are corresponding to the file.

When deleting the file, the management node deletes the metadata of the file; reclaims the space, that is, the first virtual space or the second virtual space, that is allocated from the global virtual address space to the file; determines, according to the preset correspondence between the global virtual address space and the local virtual address space, the storage node that is used to store the file, where the correspondence may be set before the space is allocated to the file or when the space is being allocated to the file; and sends the space reclaiming message to the storage node. The storage node reclaims, according to the space reclaiming message, the local virtual address space and the local physical storage space that are corresponding to the file.

According to the file management method in this embodiment of the present disclosure, in global virtual address space of a distributed storage system, space is allocated to a file and the space is reclaimed; therefore, management complexity is low, and file management efficiency can be improved.

It should be understood that, specific examples in this embodiment of the present disclosure are merely intended to help a person skilled in the art better understand this embodiment of the present disclosure, but are not intended to limit the scope of this embodiment of the present disclosure.

It should also be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

The foregoing describes in detail the file management method according to the embodiment of the present disclosure. The following describes in detail a distributed storage system and a management node according to an embodiment of the present disclosure.

Figure 8:
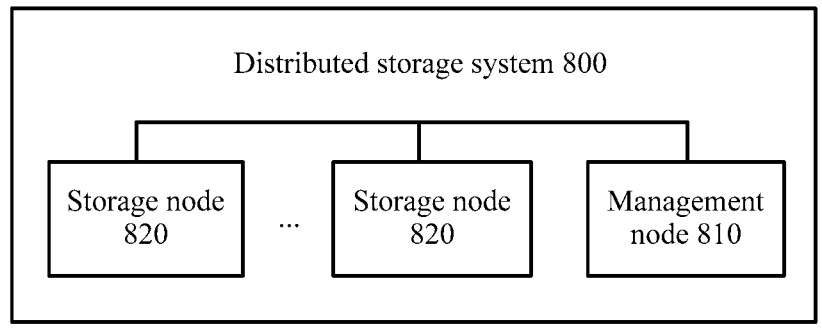
FIG. 8 is a schematic block diagram of a distributed storage system according to an embodiment of the present disclosure.

FIG. 8 shows a schematic block diagram of a distributed storage system 800 according to an embodiment of the present disclosure. As shown in FIG. 8, the distributed storage system 800 includes: a management node 810 and multiple storage nodes 820.

Local virtual address space of each of the multiple storage nodes 820 is corresponding to a part of global virtual address space of the distributed storage system 800.

The management node 810 is configured to: receive a file creation request sent by a host, where the file creation request is used to request to create a file in the distributed storage system 800; allocate, to the file, first virtual space from the global virtual address space according to the file creation request; record metadata of the file, where the metadata of the file includes information about the first virtual space allocated to the file, and the information about the first virtual space is used to point to local virtual address space of a storage node 820 that is used to store the file; and send a file creation success response to the host, where the file creation success response carries the information about the first virtual space.

According to the distributed storage system in this embodiment of the present disclosure, space is allocated from global virtual address space to a file, and the file may be managed based on the allocated global virtual address space, without a need to process complex storage location information of a data block of the file, so that file management efficiency can be improved.

In this embodiment of the present disclosure, optionally, an address bit quantity of the global virtual address space is greater than an address bit quantity of the local virtual address space of the storage node 820 in the distributed storage system 800.

In this embodiment of the present disclosure, optionally, the address bit quantity of the global virtual address space is twice the address bit quantity of the local virtual address space of the storage node 820 in the distributed storage system 800, where N most significant bits of an address of the global virtual address space are used to point to the storage node 820, N least significant bits of the address of the global virtual address space are used to point to the local virtual address space of the storage node 820, and N is the address bit quantity of the local virtual address space of the storage node 820.

In this embodiment of the present disclosure, optionally, the information about the first virtual space includes a start address and a size, of the file, in the global virtual address space.

In this embodiment of the present disclosure, optionally, the global virtual address space includes multiple areas, and different areas in the multiple areas have different space allocation granularities.

The management node 810 is specifically configured to allocate, to the file, the first virtual space from a first area in the global virtual address space of the distributed storage system 800 according to the file creation request and a space allocation granularity of the first area, where the first area is an area whose space allocation granularity is the smallest in areas that can be currently allocated.

In this embodiment of the present disclosure, optionally, the management node 810 is further configured to: receive a file space expansion request sent by the host, where the file space expansion request is used to request to expand space of the file; allocate, to the file, second virtual space from a second area in the global virtual address space according to the file space expansion request and a space allocation granularity of the second area, where the space allocation granularity of the second area is greater than the space allocation granularity of the first area; update the metadata of the file, where an updated metadata of the file includes information about the second virtual space allocated to the file; and send a file space expansion response to the host, where the file space expansion response carries the information about the second virtual space.

In this embodiment of the present disclosure, optionally, the management node 810 is further configured to: delete the metadata of the file, reclaim the space that is allocated from the global virtual address space to the file; determine, according to a preset correspondence between the global virtual address space and the local virtual address space, the storage node 820 that is used to store the file; and send a space reclaiming message to the storage node 820 that is used to store the file, where the space reclaiming message is used to instruct the storage node 820 that is used to store the file to reclaim the local virtual address space and local physical storage space that are corresponding to the file.

The storage node 820 that is used to store the file is configured to reclaim, according to the space reclaiming message, the local virtual address space and the local physical storage space that are corresponding to the file.

The management node 810 and the storage node 820 in the distributed storage system 800 according to this embodiment of the present disclosure may be corresponding to a management node and a storage node in the foregoing method embodiment, and the management node 810 can execute corresponding procedures of the foregoing methods. For brevity, details are not described herein.

Figure 9:
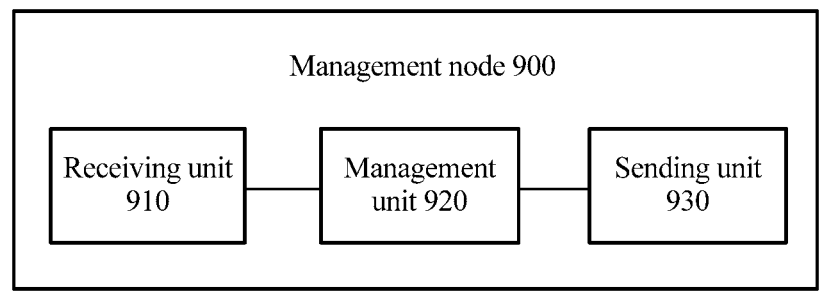
FIG. 9 is a schematic block diagram of a management node according to an embodiment of the present disclosure.

FIG. 9 shows a schematic block diagram of a management node 900 according to an embodiment of the present disclosure. As shown in FIG. 9, the management node 900 includes:

a receiving unit 910, configured to receive a file creation request sent by a host, where the file creation request is used to request to create a file in a distributed storage system;

a management unit 920, configured to: allocate, to the file, first virtual space from global virtual address space of the distributed storage system according to the file creation request, where local virtual address space of each storage node in the distributed storage system is corresponding to a part of the global virtual address space; and record metadata of the file, where the metadata of the file includes information about the first virtual space allocated to the file, and the information about the first virtual space is used to point to local virtual address space of a storage node that is used to store the file; and a sending unit 930, configured to send a file creation success response to the host, where the file creation success response carries the information about the first virtual space.

According to the management node in this embodiment of the present disclosure, space is allocated to a file from global virtual address space of a distributed storage system, and the file may be managed based on the allocated global virtual address space, without a need to process complex storage location information of a data block of the file, so that file management efficiency can be improved.

In this embodiment of the present disclosure, optionally, an address bit quantity of the global virtual address space is greater than an address bit quantity of local virtual address space of a storage node in the distributed storage system.

In this embodiment of the present disclosure, optionally, the address bit quantity of the global virtual address space is twice the address bit quantity of the local virtual address space of the storage node in the distributed storage system, where N most significant bits of an address of the global virtual address space are used to point to the storage node, N least significant bits of the address of the global virtual address space are used to point to the local virtual address space of the storage node, and N is the address bit quantity of the local virtual address space of the storage node.

In this embodiment of the present disclosure, optionally, the information about the first virtual space includes a start address and a size, of the file, in the global virtual address space.

In this embodiment of the present disclosure, optionally, the global virtual address space includes multiple areas, and different areas in the multiple areas have different space allocation granularities.

The management unit 920 is specifically configured to allocate, to the file, the first virtual space from a first area in the global virtual address space of the distributed storage system according to the file creation request and a space allocation granularity of the first area, where the first area is an area whose space allocation granularity is the smallest in areas that can be currently allocated.

In this embodiment of the present disclosure, optionally, the receiving unit 910 is further configured to receive a file space expansion request sent by the host, where the file space expansion request is used to request to expand space of the file.

The management unit 920 is further configured to: allocate, to the file, second virtual space from a second area in the global virtual address space according to the file space expansion request and a space allocation granularity of the second area, where the space allocation granularity of the second area is greater than the space allocation granularity of the first area; and update the metadata of the file, where an updated metadata of the file includes information about the second virtual space allocated to the file.

The sending unit 930 is further configured to send a file space expansion response to the host, where the file space expansion response carries the information about the second virtual space.

In this embodiment of the present disclosure, optionally, the management unit 920 is further configured to: delete the metadata of the file, and reclaim the space that is allocated from the global virtual address space to the file; and determine, according to a preset correspondence between the global virtual address space and the local virtual address space, the storage node that is used to store the file.

The sending unit 930 is further configured to send a space reclaiming message to the storage node that is used to store the file, where the space reclaiming message is used to instruct the storage node that is used to store the file to reclaim the local virtual address space and local physical storage space that are corresponding to the file.

The management node 900 according to this embodiment of the present disclosure may be corresponding to an execution body of the file management method 200 according to the embodiment of the present disclosure. In addition, the foregoing and other operations and/or functions of the modules in the management node 900 are respectively used to implement corresponding procedures of the foregoing methods. For brevity, details are not described herein.

According to the management node in this embodiment of the present disclosure, in global virtual address space of a distributed storage system, space is allocated to a file and the space is reclaimed; therefore, management complexity is low, and file management efficiency can be improved.

Figure 10:
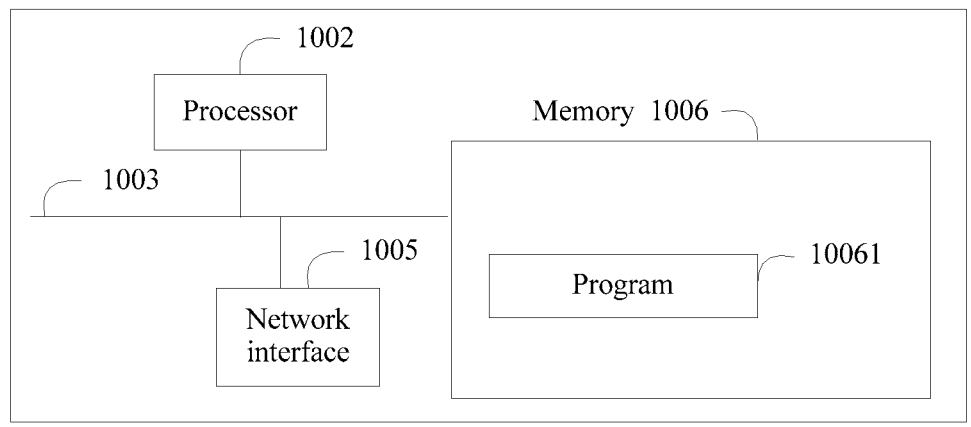
FIG. 10 is a schematic block diagram of a management node according to another embodiment of the present disclosure.

FIG. 10 shows a structure of a management node according to another embodiment of the present disclosure. The management node includes at least one processor 1002 (for example, a CPU), at least one network interface 1005 or another communications interface, a memory 1006, and at least one communications bus 1003.

The communications bus 1003 is configured to implement connections and communication between these apparatuses.

The processor 1002 is configured to execute an executable module, such as a computer program, stored in the memory 1006.

The memory 1006 may include a high-speed random access memory (RAM), and may further include an NVM, such as at least one magnetic disk memory.

The management node implements a communication connection to at least one other network element (such as a storage node or a host) using the at least one network interface 1005 (which may be wired or wireless).

In some implementation manners, the memory 1006 stores a program 10061. The processor 1002 is configured to execute the program 10061, so as to implement each method in the foregoing method embodiment.

It should be understood that, the term "and/or" in the embodiments of the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, node, and unit, reference may be made to a corresponding process in the foregoing method embodiments, and details are not described herein.

In the embodiments provided in this application, it should be understood that the disclosed system, node, and method may be implemented in other manners. For example, the described node embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the nodes or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes multiple instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A file management method, comprising:
   receiving, by a distributed storage system, a file access request from a host to access a file stored in the distributed storage system, the distributed storage system comprising multiple storage nodes, the file access request comprising information about a first global virtual space in a global virtual address space of the distributed storage system, wherein the information about the first global virtual space comprises a file start address and a file size of the file in the global virtual address space;
   determining, by the distributed storage system from the multiple storage nodes, a first storage node storing the file according to the information about the first global virtual space, the information about the first global virtual space being mapped to a first local virtual address space of the first storage node, and the first local virtual address space of the first storage node being mapped to a first local physical storage space of the first storage node for storing the file; and
   sending, by the distributed storage system, the file access request to the first storage node for accessing the file.

2. The method of claim 1, further comprising:
   receiving a file creation request from the host to create the file in the distributed storage system;
   allocating, to the file, the first global virtual space from the global virtual address space of the distributed storage system according to the file creation request; and
   sending, to the host, a file creation success response carrying information about the first global virtual space.

3. The method of claim 1, wherein an address bit quantity of the global virtual address space is greater than an address bit quantity of local virtual address space of a storage node in the distributed storage system.

4. The method of claim 1, wherein the address bit quantity 2N of the global virtual address space is twice the address bit quantity N of the local virtual address space of the storage node in the distributed storage system, wherein the N most significant bits of an address of the global virtual address space are used to point to the storage node and the N least significant bits of the address of the global virtual address space are used to point to the local virtual address space of the storage node.

5. The method of claim 2, wherein the global virtual address space comprises multiple areas and different areas in the multiple areas have different space allocation granularities; and
   the allocating comprises:
   allocating, to the file, the first global virtual space from a first area in the global virtual address space of the distributed storage system according to the file creation request and a space allocation granularity of the first area, wherein the space allocation granularity of the first area is the smallest value among that of areas that can be currently allocated.

6. The method of claim 5, wherein the method further comprises:
   receiving a file space expansion request sent by the host requesting to expand a space of the file;
   allocating, to the file, second global virtual space from a second area in the global virtual address space according to the file space expansion request and a space allocation granularity of the second area, wherein the space allocation granularity of the second area is greater than the space allocation granularity of the first area; and
   sending a file space expansion response to the host carrying information about the second global virtual space, the information about the second global virtual space being mapped to second local virtual address space of a second storage node that stores the file.

7. The method of claim 2, wherein the method further comprises:
   reclaiming the first global virtual space allocated from the global virtual address space to the file; and
   instructing, according to a correspondence between the global virtual address space and the local virtual address space, the first storage node to reclaim the first local virtual address space and the first local physical storage space corresponding to the file.

8. A distributed storage system, comprising:
   multiple storage nodes,
   a management node coupled to the multiple storage nodes and configured to:
   receive a file access request from a host to access a file stored in the distributed storage system, the distributed storage system comprising multiple storage nodes, the file access request comprising information about a first global virtual space in a global virtual address space of the distributed storage system, wherein the information about the first global virtual space comprises a file start address and a file size of the file in the global virtual address space;

determine, from the multiple storage nodes, a first storage node storing the file according to the information about first global virtual space, the information about the first global virtual space being mapped to a first local virtual address space of the first storage node, and the first local virtual address space of the first storage node being mapped to a first local physical storage space of the first storage node for storing the file; and send the file access request to the first storage node for accessing the file.

9. The distributed storage system of claim 8, wherein the management node is further configured to:

receive a file creation request from the host to create the file in the distributed storage system;

allocate, to the file, based on the file creation request, the first global virtual space from the global virtual address space of the distributed storage system; and send, to the host, a file creation success response carrying information about the first global virtual space.

10. The distributed storage system of claim 8, wherein an address bit quantity of the global virtual address space is greater than an address bit quantity of local virtual address space of a storage node in the distributed storage system.

11. The distributed storage system of claim 10, wherein the address bit quantity 2N of the global virtual address space is twice the address bit quantity N of the local virtual address space of the storage node in the distributed storage system, wherein the N most significant bits of an address of the global virtual address space are used to point to the storage node and the N least significant bits of the address of the global virtual address space are used to point to the local virtual address space of the storage node.

12. The distributed storage system of claim 9, wherein the global virtual address space comprises multiple areas and different areas in the multiple areas have different space allocation granularities; and the management node is configured to allocate, to the file, the first global virtual space from a first area in the global virtual address space of the distributed storage system according to the file creation request and a space allocation granularity of the first area, wherein the space allocation granularity of the first area is the smallest value among that of areas that can be currently allocated.

13. The distributed storage system of claim 12, wherein the management node is further configured to:

receive a file space expansion request sent by the host requesting to expand a space of the file;

allocate, to the file, second global virtual space from a second area in the global virtual address space according to the file space expansion request and a space allocation granularity of the second area, wherein the space allocation granularity of the second area is greater than the space allocation granularity of the first area; and send a file space expansion response to the host carrying the information about the second global virtual space, the information about the second global virtual space being mapped to second local virtual address space of a second storage node, in the multiple storage nodes, that stores the file.

14. The distributed storage system of claim 9, wherein the management node is further configured to:

reclaim the first global virtual space allocated from the global virtual address space to the file; and instruct, according to a correspondence between the global virtual address space and the local virtual address space, the first storage node to reclaim the first local virtual address space and the first local physical storage space corresponding to the file.

15. A management node, comprising:

a communications interface configured to communicate with multiple storage nodes; and a processor coupled to the communications interface and configured to:

receive a file access request from a host to access a file stored in a distributed storage system comprising multiple storage nodes, the file access request comprising information about a first global virtual space in a global virtual address space of the distributed storage system, wherein the information about the first global virtual space comprises a file start address and a file size of the file in the global virtual address space;

determine, from the multiple storage nodes, a first storage node storing the file according to the information about first global virtual space, the information about the first global virtual space being mapped to a first local virtual address space of the first storage node, and the first local virtual address space of the first storage node being mapped to a first local physical storage space of the first storage node for storing the file;

send the file access request to the first storage node for accessing the file.

16. The management node of claim 15, wherein the processor is further configured to:

receive a file creation request from the host to create the file in the distributed storage system, the distributed storage system comprising the management node and the multiple storage nodes;

allocate, to the file according to the file creation request, first global virtual space from global virtual address space of the distributed storage system, wherein local virtual address space of each storage node in the distributed storage system corresponds to a part of the global virtual address space; and send, to the host, a file creation success response carrying information about the first global virtual space.

17. The management node of claim 15, wherein an address bit quantity 2N of the global virtual address space is twice the address bit quantity N of the local virtual address space of the storage node in the distributed storage system, wherein the N most significant bits of an address of the global virtual address space are used to point to the storage node and the N least significant bits of the address of the global virtual address space are used to point to the local virtual address space of the storage node.

18. The management node of claim 16, wherein the processor is further configured to:

reclaim the first global virtual space allocated from the global virtual address space to the file; and instruct, according to a correspondence between the global virtual address space and the local virtual address space, the first storage node to reclaim the first local virtual address space and the first local physical storage space corresponding to the file.

* * * * *

UNITED STATES PATENT AND TRADEMARK OFFICE
CERTIFICATE OF CORRECTION

| | | |
|---|---|---|
| PATENT NO. | : 11,656,763 B2 | Page 1 of 1 |
| APPLICATION NO. | : 17/306494 | |
| DATED | : May 23, 2023 | |
| INVENTOR(S) | : Xu et al. | |

It is certified that error appears in the above-identified patent and that said Letters Patent is hereby corrected as shown below:

On the Title Page

Under item (56), Other Publications, Right-Hand Column, Line 1: "Systan" should read -- System --.

Signed and Sealed this
Twenty-ninth Day of August, 2023

Katherine Kelly Vidal
*Director of the United States Patent and Trademark Office*